(12) United States Patent
Baldwin et al.

(10) Patent No.: US 7,343,650 B2
(45) Date of Patent: Mar. 18, 2008

(54) WEB ADJUSTER AND HARNESS FOR CHILD RESTRAINT SEAT

(75) Inventors: Jeffrey P. Baldwin, Phoenix, AZ (US); Timothy A. Swann, Mesa, AZ (US); Lawrence Endicott, Mesa, AZ (US); David T. Merrill, Scottsdale, AZ (US)

(73) Assignee: AmSafe Commercial Products, Inc., Tempe, AZ (US)

( * ) Notice: Subject to any disclaimer, the term of this patent is extended or adjusted under 35 U.S.C. 154(b) by 0 days.

(21) Appl. No.: 11/383,019

(22) Filed: May 12, 2006

(65) Prior Publication Data

US 2006/0261649 A1    Nov. 23, 2006

Related U.S. Application Data

(62) Division of application No. 10/822,366, filed on Apr. 12, 2004, now abandoned.

(60) Provisional application No. 60/465,366, filed on Apr. 24, 2003.

(51) Int. Cl.
*A44B 11/25* (2006.01)

(52) U.S. Cl. .......................................... 24/503; 24/515
(58) Field of Classification Search .................. 24/337, 24/170, 328, 503, 515, 498
See application file for complete search history.

(56) References Cited

U.S. PATENT DOCUMENTS

| | | | | | |
|---|---|---|---|---|---|
| 839,638 | A | * | 12/1906 | Price | 188/67 |
| 1,216,943 | A | * | 2/1917 | Champie | 188/67 |
| 1,272,991 | A | * | 7/1918 | Paglieri | 24/134 P |
| 2,488,709 | A | * | 11/1949 | Colwell | 24/498 |
| 2,653,365 | A | * | 9/1953 | Elsner | 24/170 |
| 2,903,774 | A | * | 9/1959 | Harley | 24/170 |
| 3,252,193 | A | * | 5/1966 | Matthews et al. | 24/170 |
| 3,565,448 | A | * | 2/1971 | Angelbeck | 277/500 |
| 4,549,770 | A | * | 10/1985 | Kurtti | 297/479 |
| 6,427,291 | B1 | * | 8/2002 | Kim | 24/191 |
| 6,543,096 | B2 | * | 4/2003 | Settelmayer et al. | 24/170 |
| 6,863,197 | B1 | * | 3/2005 | Dirlam et al. | 223/93 |

* cited by examiner

*Primary Examiner*—Sarah B. McPartlin
(74) *Attorney, Agent, or Firm*—Perkins Coie LLP

(57) ABSTRACT

The invention relates, generally, to a child restraint system and, more particularly, to an adjuster and harness for securing a child in a child restraint seat.

8 Claims, 15 Drawing Sheets

WEB ADJUSTER AND HARNESS FOR CHILD RESTRAINT SEAT

CROSS-REFERENCE TO RELATED APPLICATION

This application claims the benefit of U.S. Provisional Application No. 60/465,366, filed Apr. 24, 2003 and is a divisional application from U.S. patent application Ser. No. 10/822,366, filed Apr. 12, 2004 now abandoned.

FIELD OF THE INVENTION

The invention relates, generally, to a child restraint system and, more particularly, to an adjuster and harness for securing a child in a child restraint seat.

BACKGROUND OF THE INVENTION

Child restraint systems traditionally are an after market item and include a child's seat which may be temporarily installed in a vehicle. The prior art includes various types of child safety seats, including rear-facing infant seats which may or may not include a removable base, convertible seats which may be rear or forward-facing, forward-facing only seats, high-back booster seats with a five-point harness, and belt positioning booster seats, for example. The prior art seats typically include a belt arrangement for securing the seat to the vehicle. Initially, the various child restraint systems were designed to be used with the seatbelts of a vehicle, which seatbelts were originally developed for adult passengers. The prior art seatbelts include lap belts and three-point belts. With the many types of child restraint seats and the various manufacturers, one of the problems with installing child restraint seats properly has always been the incompatibility between the child restraint seat and the vehicle belt system.

More recently, a child restraint seat is secured to lower anchors of a vehicle with two clips or hooks. The hooks are coupled to the child restraint seat via webbing which either extends from each hook to a secured point on the child restraint seat, or via webbing which extends through the structure of the child restraint seat.

In addition, a harness system is required to secure the child in the seat. To accommodate children of different sizes and to make the process easier, the harness system includes a mechanism for coupling and uncoupling the harness as well as a mechanism for adjusting the length of the webbing of the harness. U.S. Pat. No. 5,160,186 discloses a low profile web adjuster. A low profile web adjuster for securing a web. A seat includes a harness, one end of which extends through a web adjuster mounted to the seat. A pivot cam on the adjuster is operable to lockingly engage one end of the harness. The cam is moved by pulling a control member having a pair of arms pivotally mounted to the cam member at a location to force the cam member apart from the web. Under normal loading, the cam member contacts and holds the web against the base wall of the adjuster and under high loading also holds the web against an upraised rib on the base wall.

U.S. Pat. No. 3,872,550 discloses a safety belt webbing adjuster. The adjuster includes a stationary spool and a wedge member, which is in spring biased contact with the stationary spool. The wedge member is operated by a release tab. The webbing material is in contact with a substantial portion of the surface of the spool and is fed between the spool and the wedge member, which locks the webbing material securely on the spool.

The prior art suffers several disadvantages. For example, it is difficult to remove and reinstall the webbing when cleaning or adjusting the product. The harness webbing can be easily disconnected from the adjuster webbing for cleaning. However, the adjuster cannot be disconnected from the central adjuster and therefore cannot be easily cleaned. In addition, an ancillary component is required commonly referred to as a web hanger which allows the harness webbings to be disconnected from the adjuster webbing. The web hanger adds cost and complexity to the system. The prior art adjusters have limitations in the belt gripping ability. The prior art adjusters and harness suffer from wear and tear and lack a degree of wear and tear. The prior art systems are difficult and costly to manufacture.

SUMMARY OF THE INVENTION

It is an object of the present invention to provide a fastener for a restraint system which is easy to latch and unlatch to an attachment point.

It is a further object of the present invention to provide an easy method of installing and removing a fastener from an attachment point.

It is a further object of the present invention to provide a fastener for a restraint system designed to avoid false indications that the fastener is securely latched to an attachment point.

It is a still a further object of the present invention to provide a fastener of a restraint system which is easy and inexpensive to manufacture.

It is yet a further object of the invention to allow the user to selectably tension a harness in a child seat and as increased tension is applied, audible and tactile feedback is given to the user. This feedback provides assurance that positive locking is applied to the harness.

DETAILED DESCRIPTION OF THE INVENTION

One preferred embodiment of the Central Adjuster includes the following components: two cam members that each include a frictional surface and a pivoting axis, a spring, and a frame. The frame holds each cam member in relation to each other such that the frictional surfaces of each cam contact either side of a piece of webbing material in a way that allows the webbing to pass easily in one direction but not in the opposite direction. A user of this device may pull the webbing through the device such that upon release of the web, the device restrains the web and resists high levels of tensile stress. The user may also desire to release this tension to readjust the webbing. A handle portion is an integral part of one or both cam members to allow the user to turn the cam member about its axis such that the frictional surface moves away from the webbing thereby release the webbing to move in either direction.

Following is a description of a typical occupant restraint system that utilizes a Central Adjuster. Refer to the pictures in FIGS. 2 and 3. The Central Adjuster 203, the webbing 202, and seat frame 201 are attached such that the webbing creates a harness for an occupant in the seat. The webbing is composed of single or multiple length(s) of webbing that can be unfastened from the seat if desired. These ends can also each be connected to the seat frame. The webbing will be strung through various slots in the seat frame and through hardware such as a chest clip 205, buckle 204, and the Central Adjuster 203. The combination of the slots in the seat frame, chest clip, buckle, and webbing creates a five point harness for an occupant.

Figure 2:
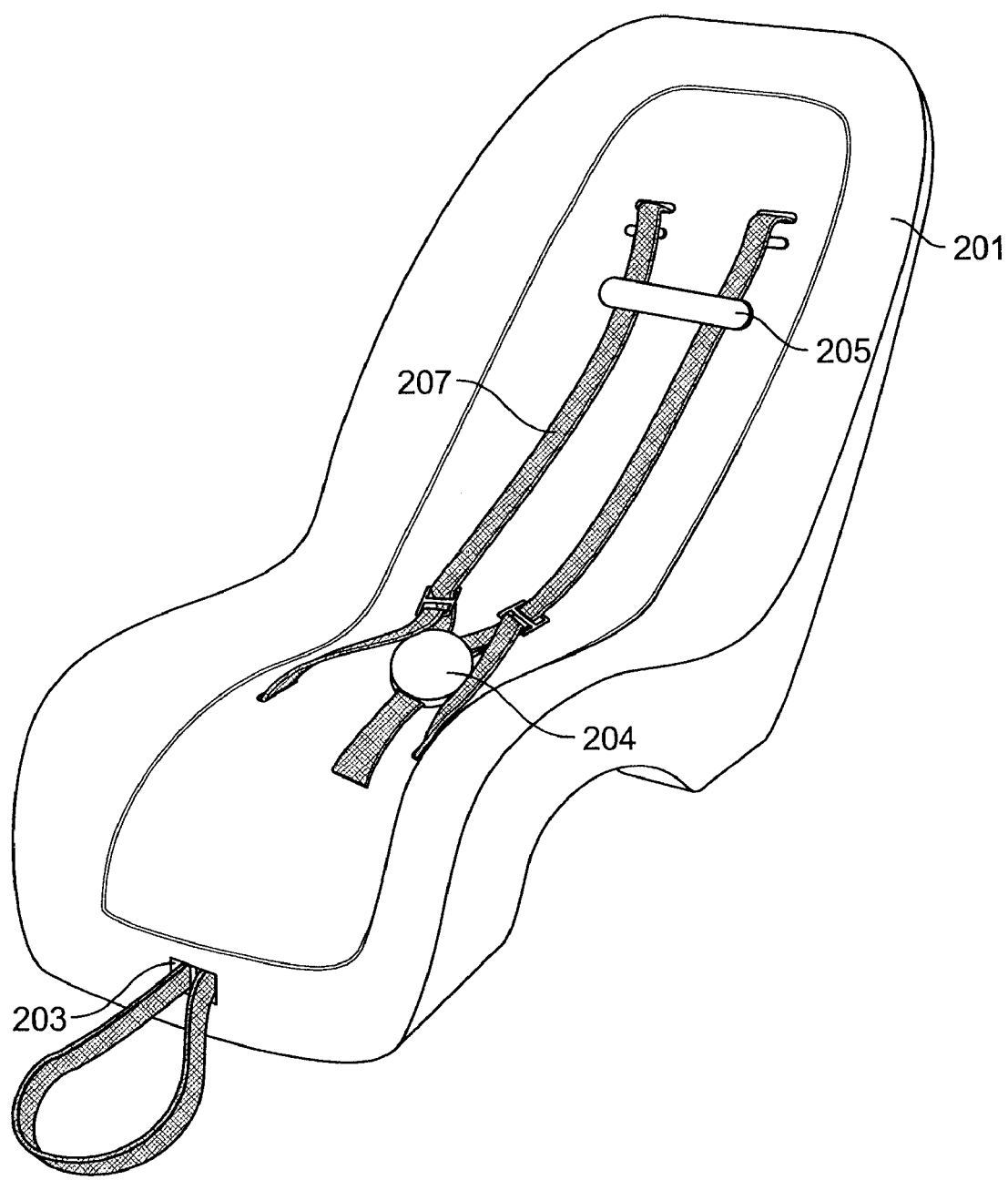
FIG. 2: Picture of the Central Adjuster, Seat Frame, and Webbing
Figure 3:
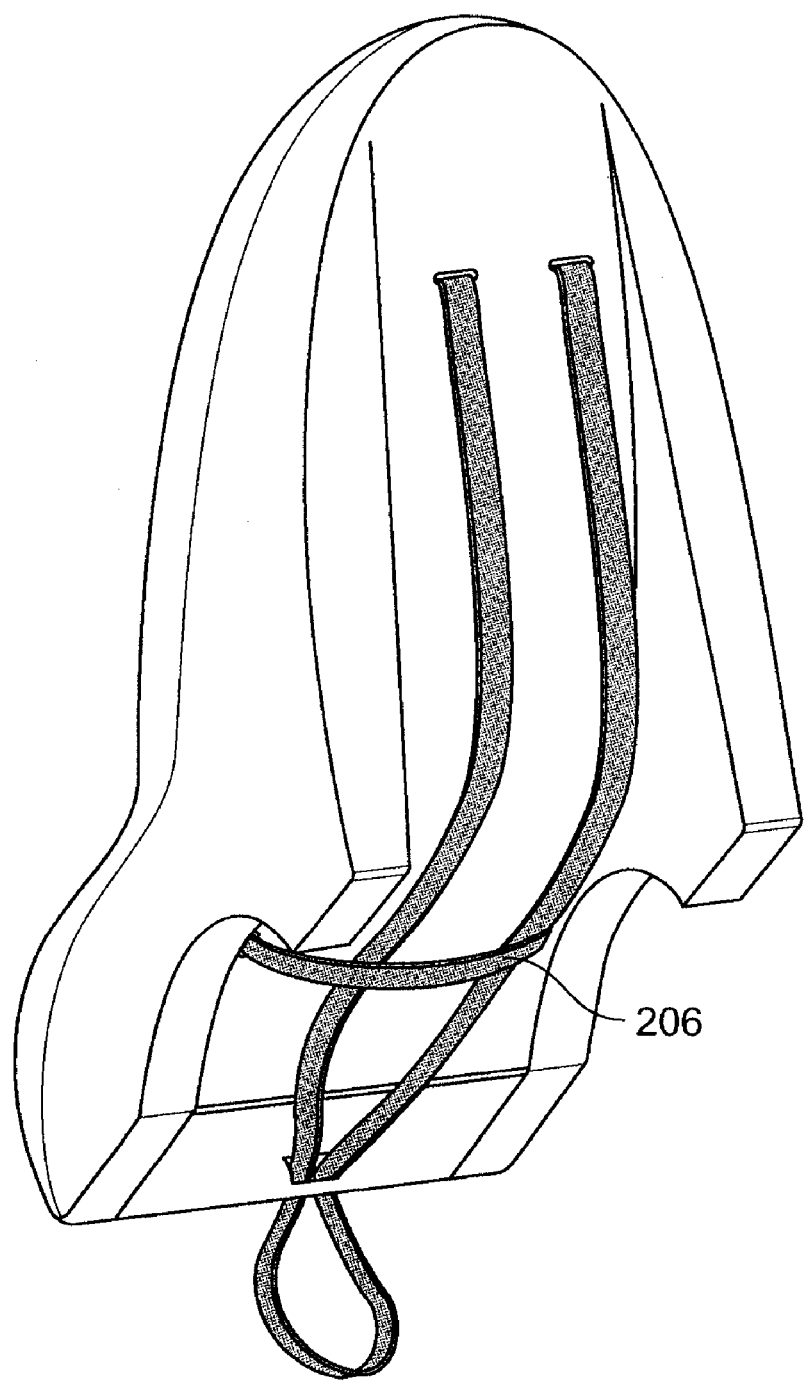
FIG. 3: Picture of the under and back sides of the seat frame showing the webbing routing.

The weaving path of the webbing that is proposed in this invention is represented in FIGS. 2 and 3. With this type of weaving path, a single length of webbing can be used. The entire webbing assembly can be a single piece of 1.5" webbing in which the ends are connected to form a loop. However, this disclosure is not limited to the use of 1.5" webbing; other sizes may need to be used depending on the application. Analyzing these figures can yield that a single length of webbing can be configured to create a large loop. The webbing has three general portions: the Adjustment Portion, the Seat Pan Portion, and the Harness Portion. Both cams of the Central Adjuster apply selectable pressure to the webbing and forces the two pieces of webbing together and resist retrograde motion and thereby prevent loosening of the harness and occupant.

Figure 1:
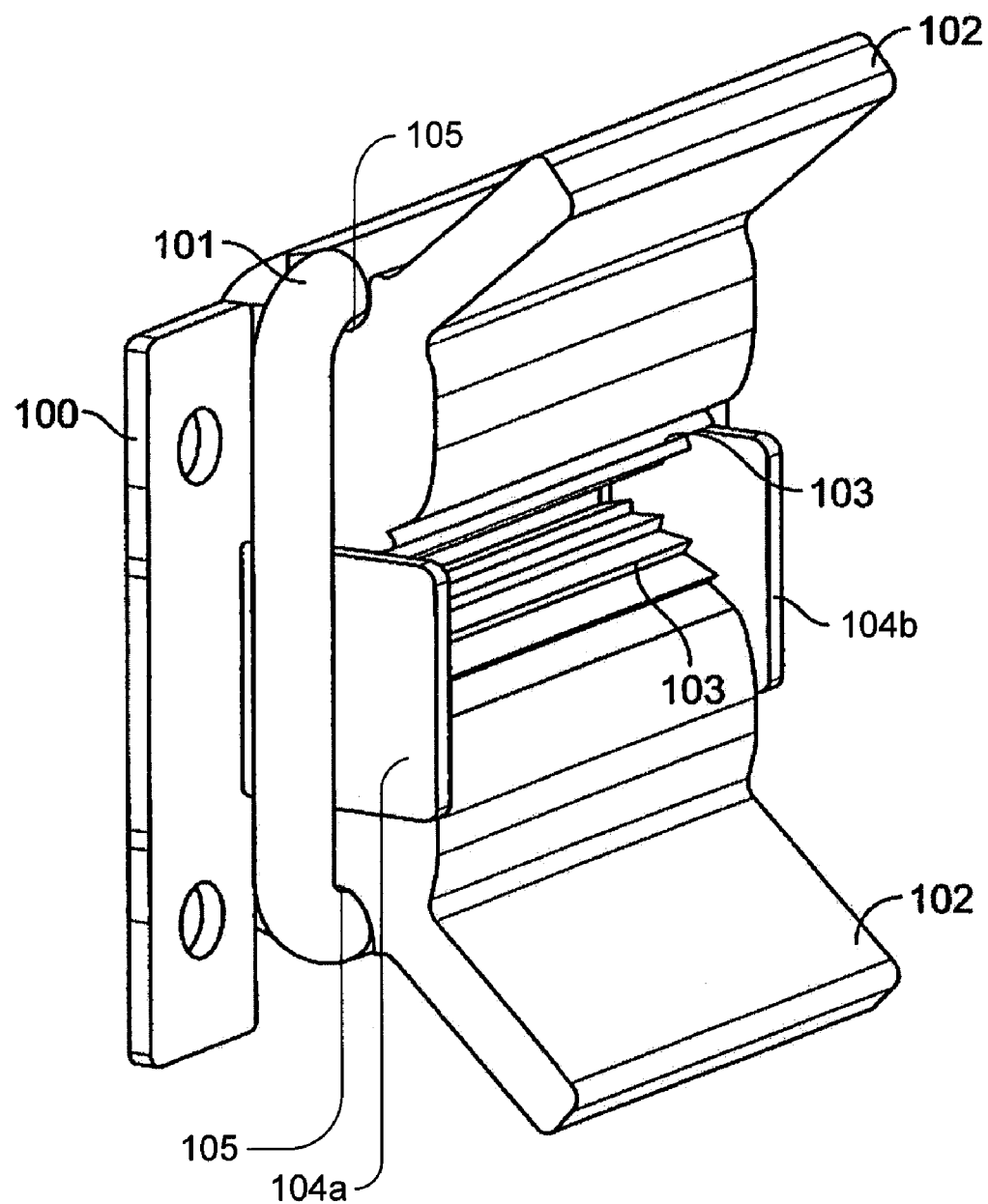
FIG. 1: Isometric View of the Central Adjuster.

One preferred embodiment of the central adjuster is represented in FIG. 1. This design contains a frame members 100 having a first plate 104*a* spaced apart from a second plate 104*b*, one continuous compression spring 101, and two cams with handles 102. The two cam members both have frictional portions 103 that oppose each other, and spring receiving portions 105. These frictional portions are urged together by the continuous spring. The two cams are eccentric on the same side relative to the frame and rotational axes (not shown). If a length of webbing is placed in-between the frictional surfaces, the spring then urges each frictional surface toward each other and to frictional engagement with either side of the webbing. If the webbing is pulled in the direction of the rotational axes, the frictional surfaces of the cams will draw the two cams closer together and further squeeze the webbing which thereby increases the resistance to further movement.

Figure 4:
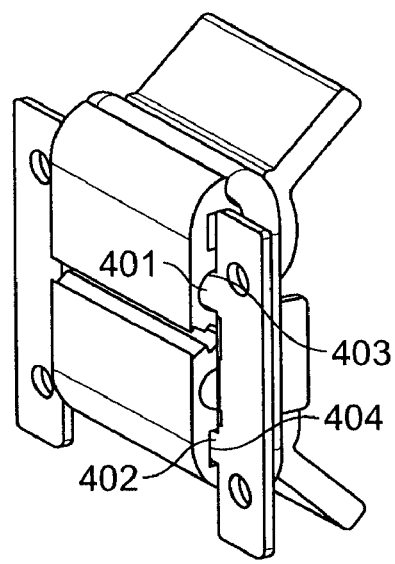
FIG. 4: Alternative Embodiment with one cam fixed to the frame.

An alternative embodiment of the device involves the fixing of one cam to the frame so that the user only has to actuate one cam to release the webbing. FIG. 4 shows this alternative embodiment. The frame is shown having a tab 402 that contacts the hole 404 with similar shape for fixing the motion of the lower cam. The tab 401 is shown in a round hole 403 in the cam that allows rotational movement of the upper cam. In this case, the upper cam would be urged toward the lower cam via a spring. This traps the webbing for unidirectional movement but still allows the user to selectively move the cam against the force of the spring so that the webbing is free to move in either direction.

Figure 5A:
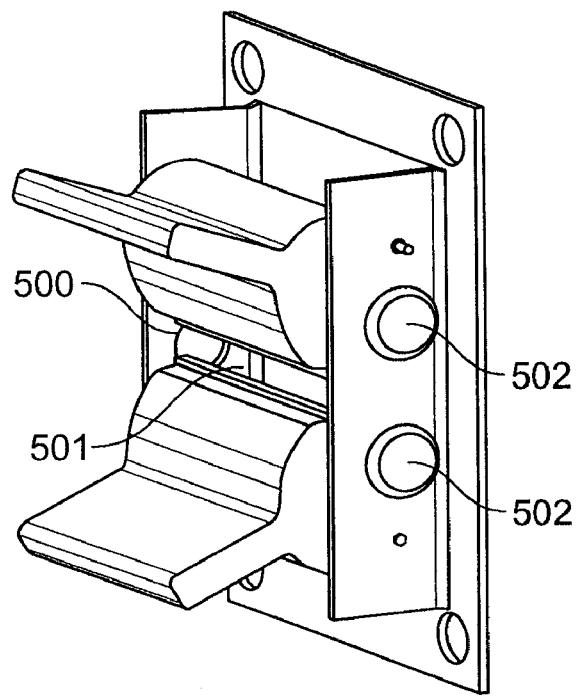
FIG. 5a: Alternative Embodiment with one cam having limited rotational freedom.
Figure 5B:
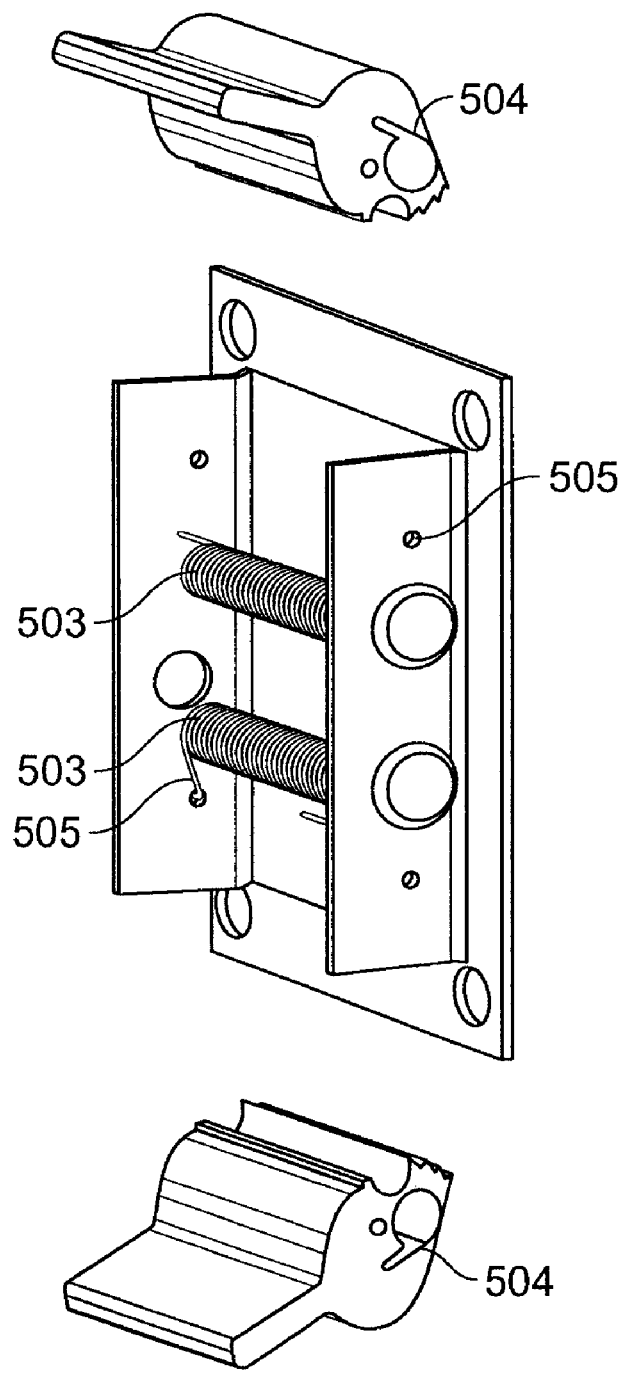
FIG. 5b: Alternative Embodiment with one cam having limited rotational freedom, exploded.

Another alternative embodiment has a feature built into the frame that allows one cam to rotate freely away from the webbing but disallows it from moving past a predetermined position. FIGS. 5*a* and 5*b* represent this idea. Axles 502 allow each cam to rotate freely. Both cams are spring loaded 503 toward each other to trap webbing such that they allow unidirectional movement of the webbing. The stop point 500 stops the cams from rotating inward but do not stop the cams from rotating outward. "Inward", in this case, means movement in the direction of the webbing relative to the axles. It may be desirable to have a stop surface 501 built into the cam that receives the stop point. The user may let go of the cam such that the spring quickly returns the cam to surface-to-surface contact with the stop point. Over time, this may wear the surfaces, so spreading out these impact loads will reduce the wear to the components. This stop point is meant only to keep one cam in position as the user pulls the other cam away from the webbing. The cams are spring loaded against each other and as the user pulls one cam, the other cam may travel rotationally and not release the webbing; the stop point will keep this from happening.

Figure 6:
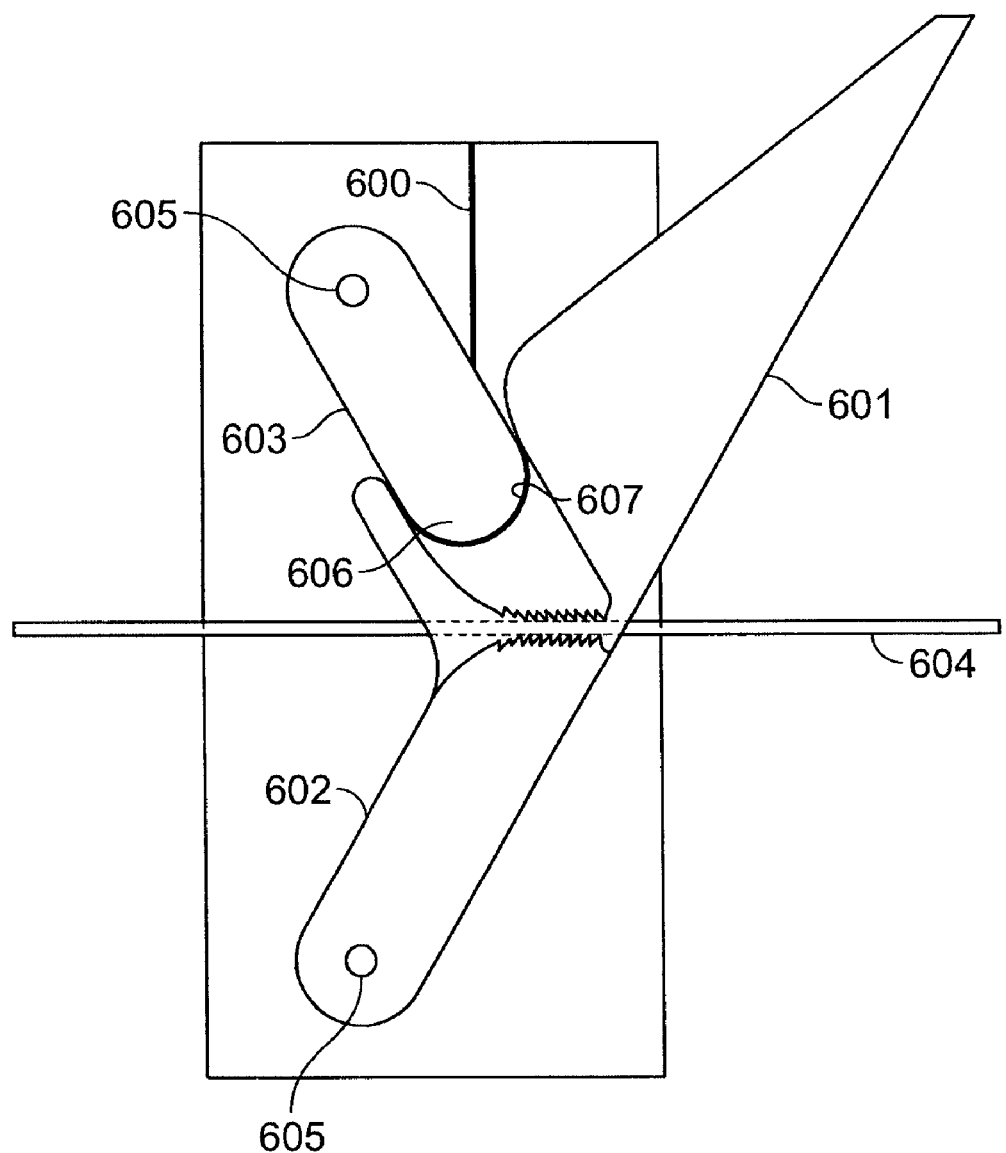
FIG. 6: Alternative Embodiment with one handle that controls both cams

Another alternative embodiment involves adding another feature to one of the cams or another component entirely that actuates both cams simultaneously with one motion from the user. An example of this embodiment is represented in FIG. 6. As with all other embodiments, two cams oppose each other and trap webbing 604 in-between the frictional surfaces. Both cams rotate around axles 605 and are spring 600 loaded toward each other. The handle 601 is a part of the lower cam (in this picture) 602 and contains a pocket 607 to receive lobe 606. As the user moves the handle to the right side direction of the figure, the lower cam moves away from the webbing and the pocket pulls the lobe which in-turn pulls the upper cam away from the webbing.

Figure 7:
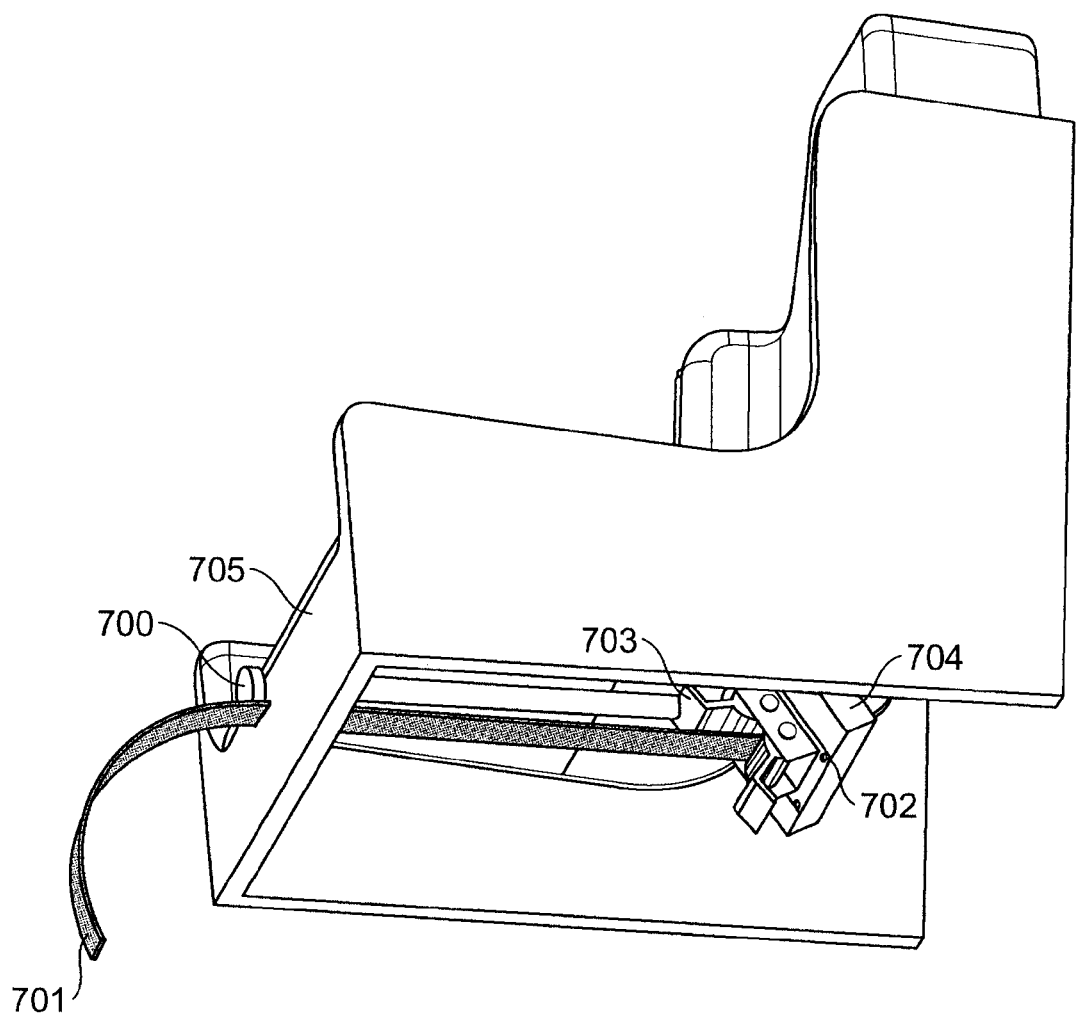
FIG. 7: Remotely controlling the Central Adjuster for alternate placement in the seat.

Depending on the construction of the occupant seat, it may be desirable to place the Central Adjuster in alternate locations than that shown in FIGS. 2 and 3. Most commercially available seats have the central adjuster mounted in the front of the seat. Mounting the Central Adjuster toward the back of the seat may relieve abrasion points to the webbing. The webbing between the adjuster and the harness portion will be under extreme tension during a crash event. Reduction to the abrasion on this portion of webbing is desirable and can be accomplished by moving the adjuster toward the back of the seat so that the webbing will not pass through and over strengthening ribs in the seat construction. FIG. 7 shows the central adjuster placed in the back of the seat. An alternate mounting 704 location is represented in this figure but is not limited to the location as shown. Alternate mounting locations can be anywhere along the webbing path on the back of the seat limited by the slots containing the shoulder portions of the webbing and the front of the seat 705. It is desirable to have a pushbutton on the outside of the seat so that user can easily actuate the central adjuster. In this figure, the pushbutton 700 is shown on the seat front. When the user pushes this button, the terminal end of this button contacts and actuates the Central Adjuster via, say, a tab 703 on the Central Adjuster. When the Central Adjuster is opened, the adjuster webbing 701 can be pulled to tighten the harness. When released, the cam(s) will be returned to a position of frictional engagement with the webbing to disallow retrograde movement.

The invention has two major modes of operation. The first mode of operation is the application of selectable tension to a length of webbing. The device acts as a one way ratchet as the webbing is pulled through it. If the device is hard mounted to an occupant seat, the user would first place the occupant in the seat and then place the harness around the occupant. The webbing that is placed in the device is pulled such that it applies tension to the harness system to restrain the occupant. The webbing pulled through the device has a first portion and a second portion. The first portion generally hangs outside of the occupant seat and the second portion is within the occupant seat framework connected to the harness to apply tension as the first portion is pulled. The user will pull the first portion until the desired tension is achieved in the harness and the device will hold that tension when the user releases the webbing. The spring inside of the device holds the cams against each side of the webbing and when the user releases the webbing, the tension stored in the harness attempts to retract the first portion into the device. As the webbing attempts to retract, the friction between the webbing and the cams causes the cams to rotate toward each other thereby squeezing the webbing between them and disallowing retrograde motion of the webbing.

The second mode of operation involves manually releasing the tension in the webbing by pushing one or both cams via the handle such that it rotates about its axis and moves the frictional surface away from the webbing thereby allowing the webbing move in the retrograde direction as desired and loosen the harness.

The disclosed invention has the advantage of providing frictional engagement of webbing on two sides. Because a simple loop is pulled through the device, it is much easier for the user to disassemble the webbing from the seat for cleaning or adjustment. The one-piece single-loop harness system is simpler and therefore less expensive than currently commercially available systems. It allows for easier adjustment of individual shoulder straps in the harness. Current commercially available systems tend to bind in the seat and often one side of the harness will be loose as the other side is taut.

FIG. 7 in the original disclosure shows a method for remotely actuating the Central Adjuster. The goal of a remote actuator is to cause one or both cams to rotate about their respective axis such that the frictional surface(s) of the cam move away from the webbing and allow the webbing to slide in either direction relative to the Central Adjuster. In this embodiment, neither cam needs to have a handle. Instead, the remote actuator can contact another integral feature in one or both cams to cause rotation. Features include, but are not limited to, splines in the internal hinge hole, splines on the outside of the cam, extra holes in the cam spaced away from the hinge hole, tabs, indentations, gear teeth, or an interference frictional fit (a.k.a. press-fit) between the actuator and the cam.

Figure 8:
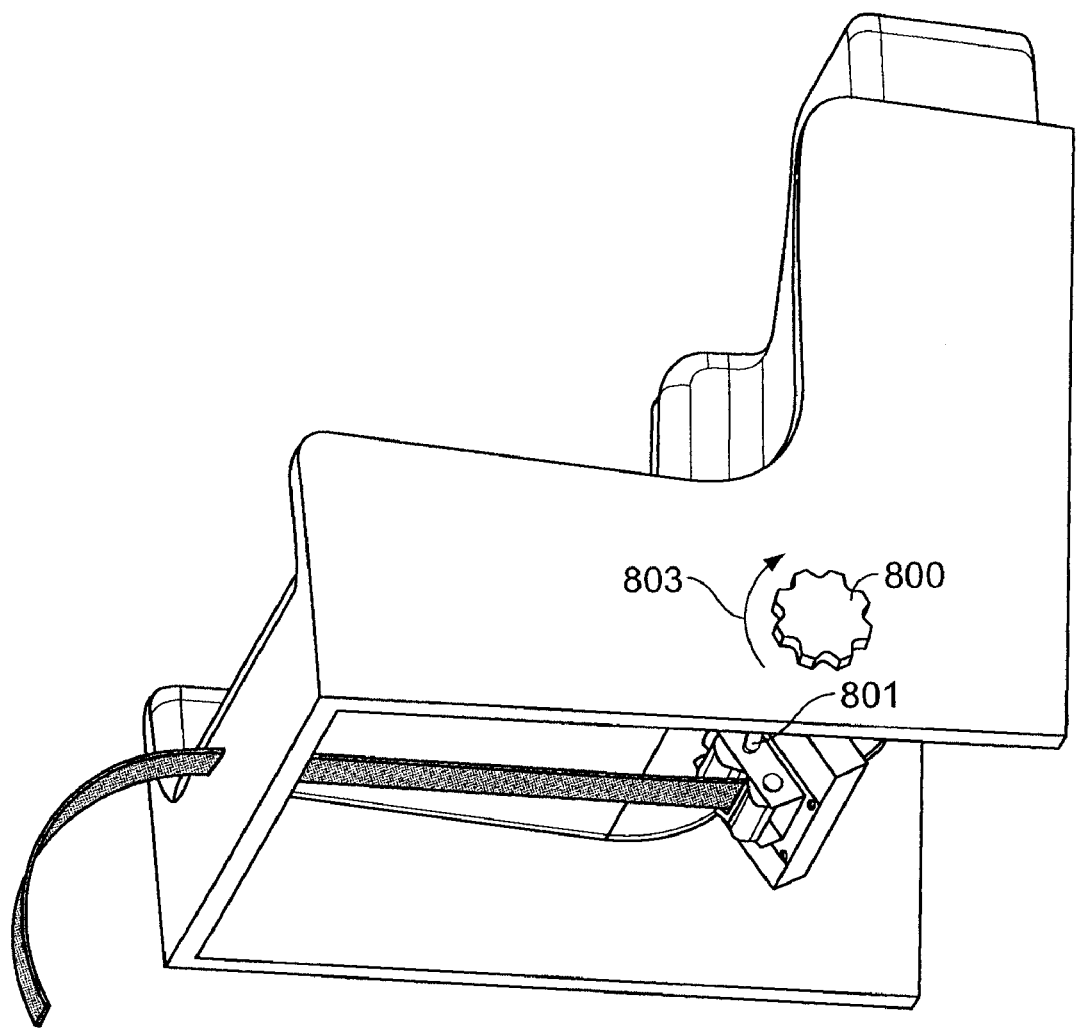
FIG. 8: An external handle for rotation of the cam.

The remote actuator needs to cause rotation of one or both cams. The remote actuator can do this by applying linear force tangential to the rotation plane such as the instance shown in FIG. 7, or through actual rotation of the cam(s) as shown in the following two FIGS. 8*a* and 8*b*. Although a single length of webbing is shown in the FIGS. 8 and 9, a loop of webbing is preferred to be placed in the device as shown in FIGS. 2 & 3. An External Handle 800 allows easy access for a parent trying to adjust the webbing of a child seat. Generally, the operator of a child seat works from the side through a vehicle door because the seat is secured to the seat of a vehicle. The handle shown in FIG. 8 is connected to the upper cam of the Central Adjuster as shown in a detail view in FIG. 9 but can be coupled to the lower cam or both cams. As the cams are spring-loaded, the handle will too be spring-loaded because the spring will drive the cam toward the webbing and drive the handle in the opposite of the direction shown for release 803. To release the webbing, the operator turns the handle in the release direction 803.

Figure 9:
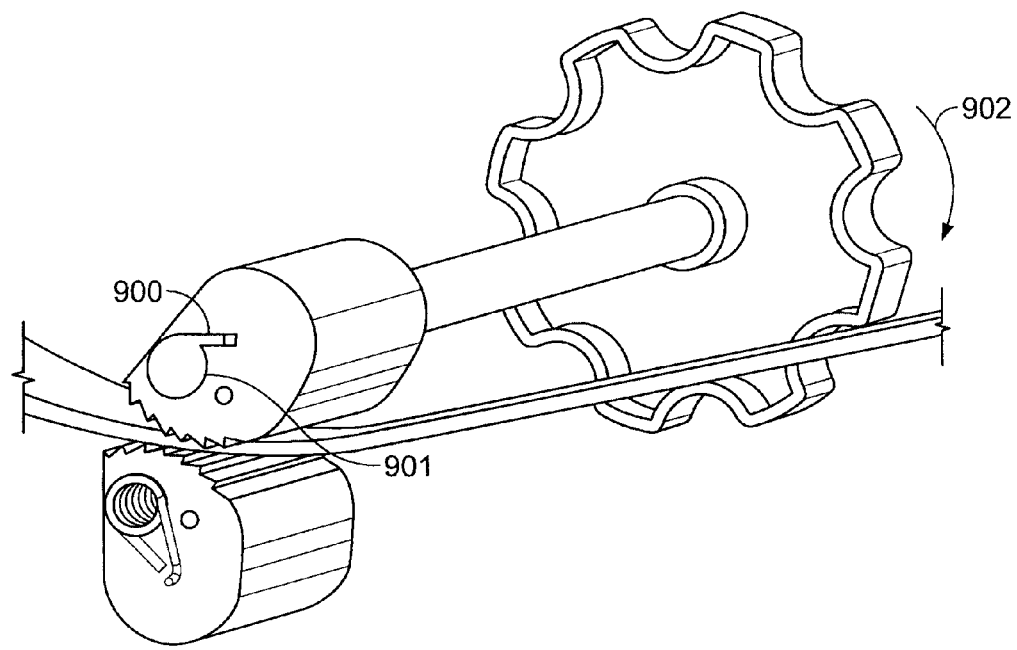
FIG. 9: A detail view of the External Handle, Shaft, and Cams.

As the operator turns the handle, the shaft 801 will turn the cam about its axis. The shaft can include features on its distal end to mechanically contact the cam. In the case of FIG. 9, a tab 901 is placed inside the slot 900. This mechanical coupling allows the user to turn the cam thereby moving the frictional surface away from the webbing against the force of the spring and allows the spring to return the handle and cam to the original position once the user releases the handle.

Of great concern is the possibility of accidental release of the Central Adjuster so that the harness webbing is loosened. This may occur because the seat occupant himself may turn the handle or because another vehicle occupant such as a child turns the handle. To prevent this accidental release, a lock an be added to the handle to prevent premature release.

Figure 10:
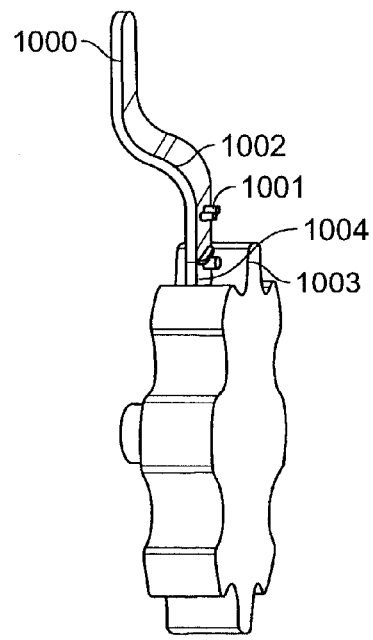
FIG. 10: Locking device for the handle.

FIG. 10 shows a tab with inherent elasticity that can be selectively pushed away from the handle to prevent rotation of the handle. The combination of pushing the release button and turning the handle requires a high level of dexterity which a parent is more likely to possess than a child. The user pushes on the component at the push point 1001 which works against the spring section 1002 and causes the contact end 1004 to push away from the detent 1003 in the handle thereby allowing the handle to freely rotate. The locking component is rigidly mounted to the seat at the mounting end 1000.

In another preferred embodiment, the invention provides the same basic function and general operation as just described. However, in that disclosure, a length of webbing was pinched in between two cams. In this invention, no webbing is pinched, instead an adjustment belt, chain or other elongated member with a plurality of spaced catch features is used with a central adjuster locking device. Use is the same. To tighten the harness, the user pulls a pull tab or the adjustment belt itself while the spring-loaded locking device interacts with the catch features to disallow retrograde motion. To loosen, the user pulls a tab or pushes a button that in turn moves the locking tooth away from the belt, thereby allowing the belt to move freely in either direction. The belt can be made of plastic, steel (or other metals), fabric, webbing, rubber, or a composite combination of materials.

Figure 11A:
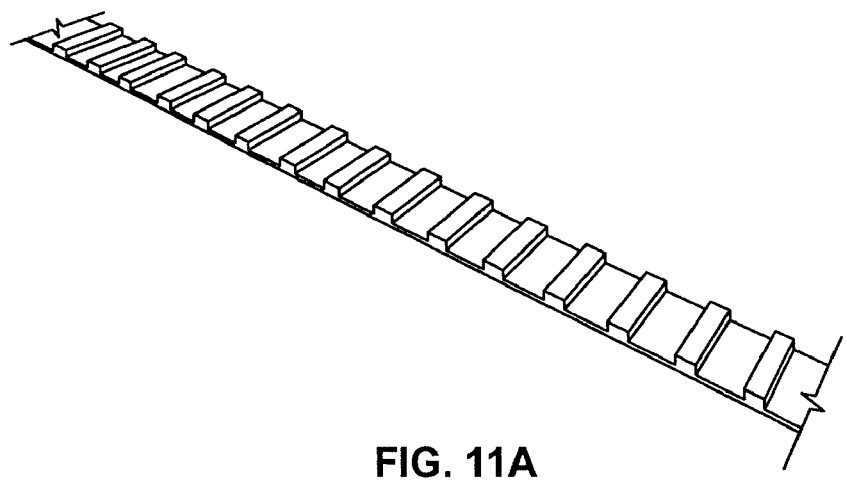
FIG. 11: Shows the ribbed belt and a ratchet tooth engaged with the belt.
Figure 11B:
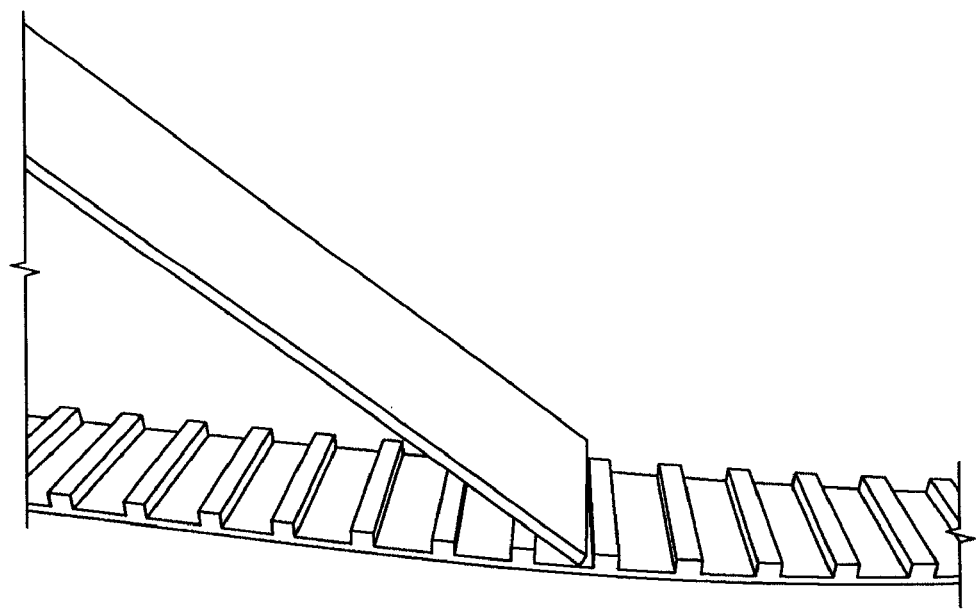
Figure 12A:
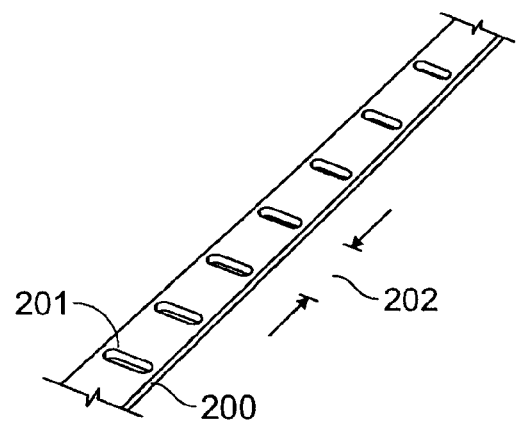
FIG. 12a: Alternate embodiment of the belt with holes.
Figure 12B:
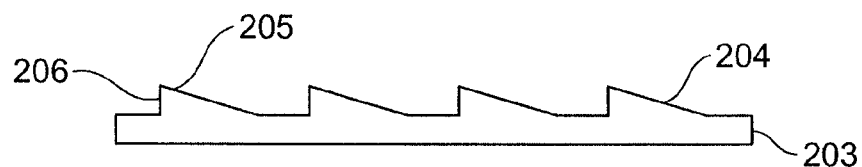
FIG. 12b: Alternate embodiment of belt with ratchet teeth.
Figure 12C:
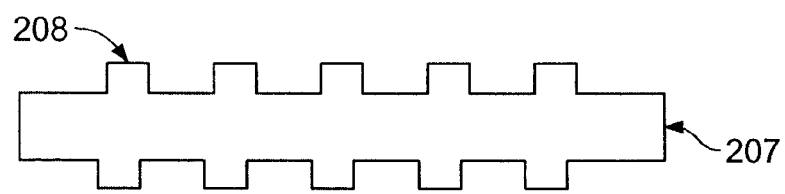
FIG. 12c: Alternate embodiment of belt with teeth on both sides of belt.
Figure 12D:
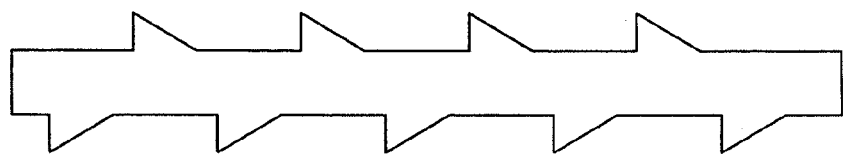
FIG. 12*d*: Alternate embodiment of belt, with rows of teeth on both sides of the belt, but staggered with one another for fine adjustment of the belt.
Figure 12E:
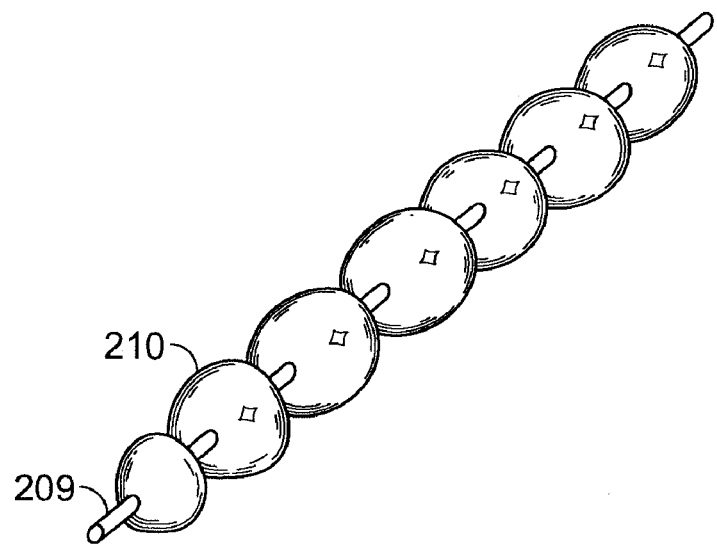
FIG. 12*e*: Alternate embodiment of belt incorporating a pull chain having a plurality of balls on a string or stem.
Figure 12F:
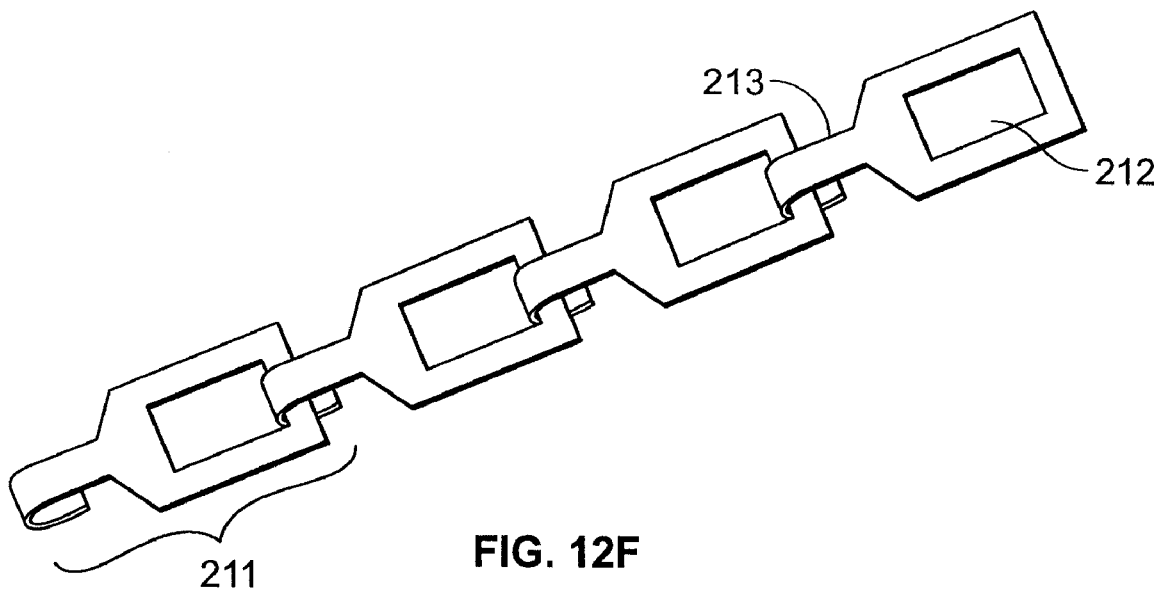
FIG. 12*f*: Alternate embodiment of belt, using a flat chain.
Figure 13:
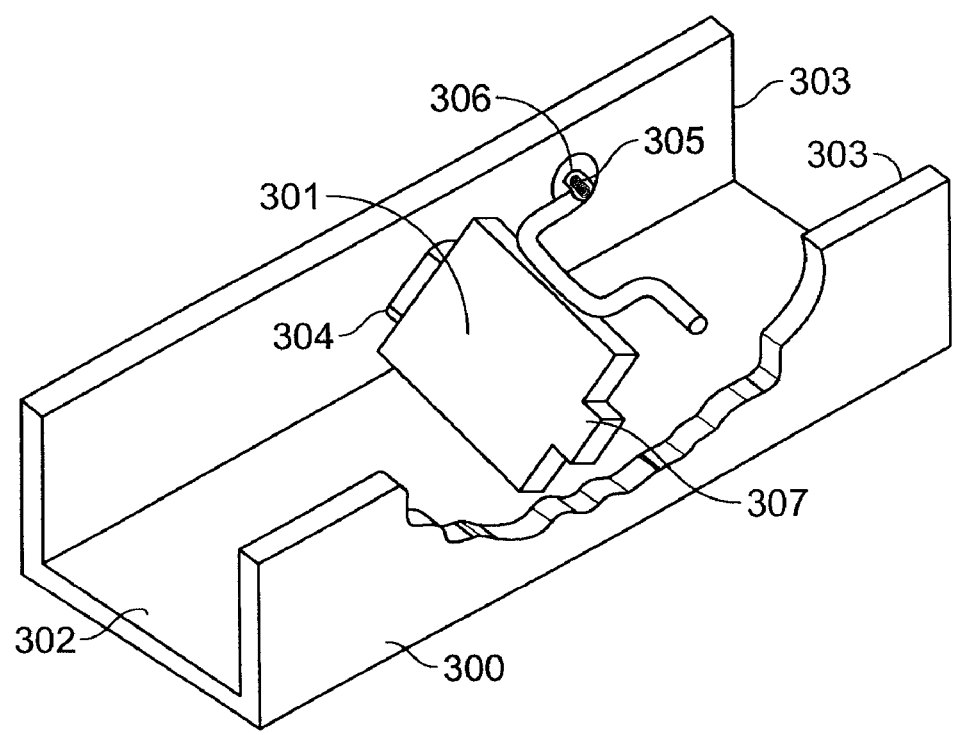
FIG. 13: One preferred embodiment of locking device.
Figure 14:
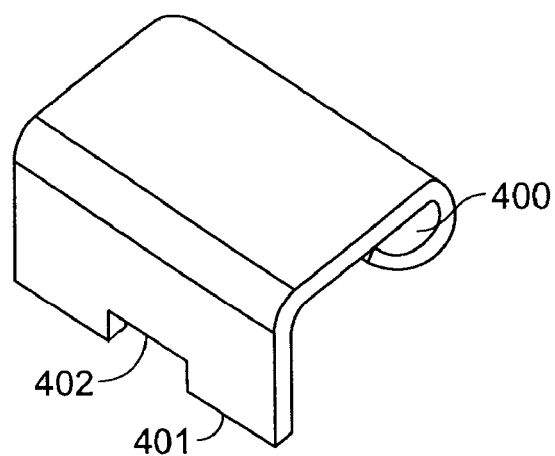
FIG. 14: Alternate embodiment of locking device having a pivoting tooth.
Figure 15A:
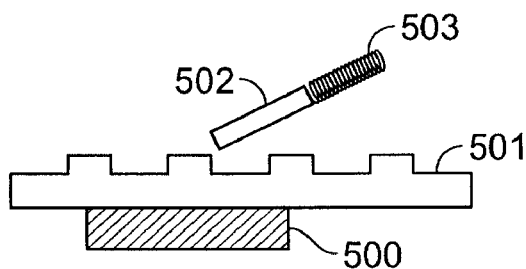
FIG. 15*a*: Sectional view showing exemplary embodiment in an unlocked condition of the central adjuster.
Figure 15B:
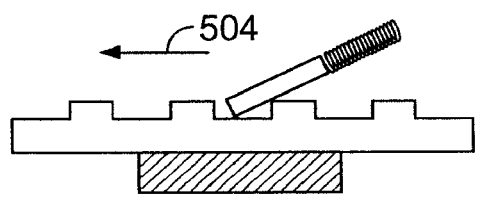
FIG. 15*b*: Sectional view showing exemplary embodiment in a locked condition of the central adjuster.
Figure 16:
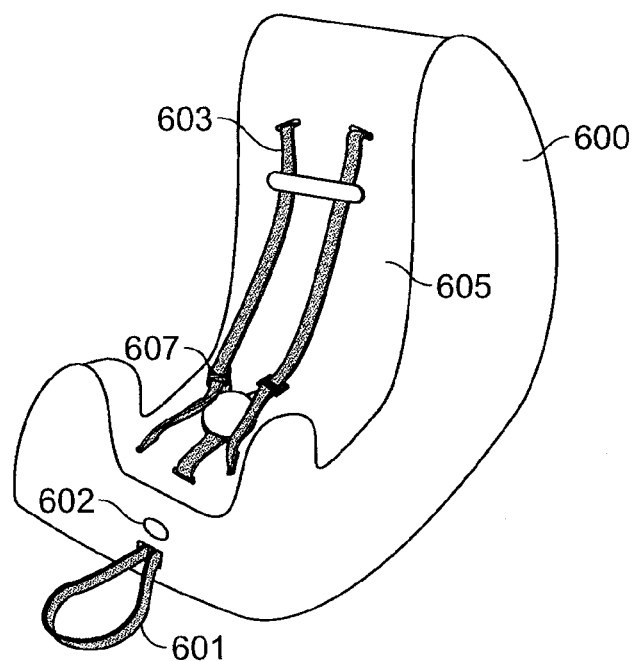
FIG. 16: Basic assembly of adjustable seat.
Figure 17:
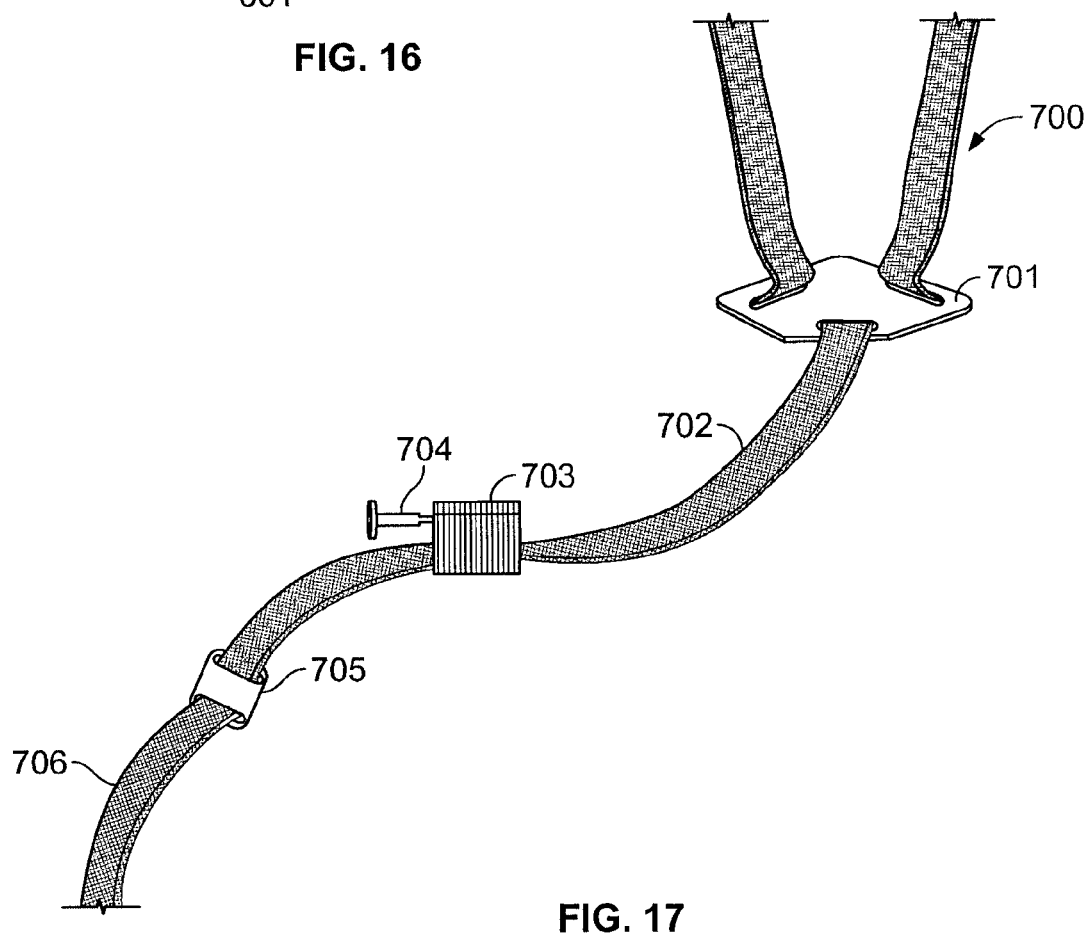
FIG. 17: Basic assembly of harness, Central Adjuster and Belt.

The preferred embodiment is a combination of the ribbed belt and the locking device. FIG. 11 shows the preferred design of the belt. FIG. 13 shows the preferred design of the locking device. FIGS. 15a and 15b show the operation and interaction between the components shown in FIGS. 11 and 13. The base or root 102 of the belt stores tensile stresses when the desired adjustment is achieved by the user & resists high loads applied by the occupant during a crash event. The tensile loads applied to the adjustment belt are reacted by the ratchet tooth 301/sliding plate 502/lock edge 402. Significant shear stresses will be stored in the belt tooth 103. It may be desirable to use multiple ratchet teeth to each interact with a different belt tooth to spread out the shear loads. A release mechanism such as a push button 704 would be integral to the locking device that allows the user to release the belt by pushing the ratchet tooth away from the belt.

What is claimed is:

1. A device for securing webbing in a restraint system, the device comprising:
    a frame having a first pivot member, a second pivot member and an opening therebetween;
    a first cam member having a pivot member receiving portion, a web friction engaging portion on a first side, and a spring receiving portion on a second side;
    a second cam member having a pivot member receiving portion, a web friction engaging portion on a first side, and a spring receiving portion on a second side, the cam members arranged with the web friction engaging portions adjacent one another, and the spring receiving portions facing away from the adjacent web friction engaging portions; and
    a continuous compression spring extending around the cam members and being received by the spring receiving portions, whereby the continuous compression spring maintains the cam members in an engaging relationship and a web may be received through the opening.

2. The device of claim 1, wherein the frame member includes a first plate extending along a first side of the cam members, and a second plate extending along a second side of the cam members, the second plate is spaced apart from the first plate with the one plate parallel to, and spaced apart from, the other plate, the plates defining an area there between, the cam members arranged within the area, with the web friction engaging portions adjacent one another, and the spring receiving portions facing away from the area and, together with the plates, defining a perimeter, the continuous compression spring extending about the perimeter.

3. The device of claim 2, wherein the first and second pivot members each include a rod, the cam pivot member receiving portions each include a bore which pivotally receives a respective rod, the web friction engaging portions include ridges, and the spring receiving portions each include a recess for receiving the continuous compression spring.

4. The device of claim 1, wherein with the cam members are arranged to define a tangent at a point the cam members are adjacent one another, and the web friction engaging portions are offset from the tangent in a common direction, whereby the friction engaging portions of each cam contact either side of a piece of webbing material in a way that allows the webbing to pass easily in one direction but not in the opposite direction, so that a user of this device may pull the webbing through the device such that upon release of the web, the device restrains the web and resists high levels of tensile stress.

5. The device of claim 4, wherein each cam member includes a protruding handle, the handle extending from adjacent the spring receiving portion, towards the common direction of the offset.

6. The device of claim 1, wherein with the cam members are arranged to define a tangent at a point the cam members are adjacent one another, and the web friction engaging portions each include ridges which extend in a common direction away from the tangent, whereby the friction engaging portions of each cam contact either side of a piece of webbing material in a way that allows the webbing to pass easily in one direction but not in the opposite direction, so that a user of this device may pull the webbing through the device such that upon release of the web, the device restrains the web and resists high levels of tensile stress.

7. The device of claim 1, further comprising a shaft having a first end and a second end, the first end extending from a side of one of the cam members, whereby the shaft is biased in the same direction as the one cam member, and the user may rotate the shaft away from the direction of bias so as to move the cam members away from the engaging relationship.

8. The device of claim 7, wherein the second end of the shaft includes a handle and a means for releasably locking the shaft to prevent rotational movement.

* * * * *

UNITED STATES PATENT AND TRADEMARK OFFICE
CERTIFICATE OF CORRECTION

PATENT NO. : 7,343,650 B2  Page 1 of 1
APPLICATION NO. : 11/383019
DATED : March 18, 2008
INVENTOR(S) : Baldwin et al.

It is certified that error appears in the above-identified patent and that said Letters Patent is hereby corrected as shown below:

In column 2, line 30, after "is" delete "a".

In column 2, line 44, after "Webbing" insert -- . --.

In column 2, line 54, after "cams" insert -- . --.

In column 3, line 59, delete "portions:" and insert -- portions; --, therefor.

In column 3, line 66, delete "members" and insert -- member --, therefor.

In column 6, line 43, delete "an" and insert -- can --, therefor.

Signed and Sealed this

Twenty-fourth Day of March, 2009

JOHN DOLL
*Acting Director of the United States Patent and Trademark Office*